United States Patent [19]

Huang

[11] Patent Number: 4,890,572

[45] Date of Patent: Jan. 2, 1990

[54] MEASUREMENT INDICATING GAUGE

[76] Inventor: Tien T. Huang, No. 4, Lane 30, Wu-Chuan St., Pan-Chiao City, Taiwan

[21] Appl. No.: 204,518

[22] Filed: Jun. 9, 1988

[51] Int. Cl.⁴ .................... G01D 3/00; G01D 13/12
[52] U.S. Cl. .................... 116/298; 73/866.3; 116/315; 116/318
[58] Field of Search .............. 116/305, 298, 315, 318, 116/334; 73/741, 742, 443, 431, 866.3

[56] References Cited

U.S. PATENT DOCUMENTS

| | | | |
|---|---|---|---|
| 934,507 | 9/1909 | Crane | 116/315 X |
| 1,672,666 | 6/1928 | Walsh | 116/305 |
| 2,317,109 | 4/1943 | Oxland | 73/431 X |
| 2,353,472 | 7/1944 | Kahn | 73/737 |
| 2,663,280 | 12/1953 | Maiorany | 116/298 X |
| 3,430,498 | 3/1969 | Goodwin | 73/431 |
| 3,641,967 | 2/1972 | Charbonneaux | 73/431 X |
| 3,810,390 | 5/1974 | Neugebauer | 73/743 |
| 3,818,763 | 6/1974 | Berleyoung et al. | 73/431 X |
| 4,010,626 | 3/1977 | Feher | 66/125 B X |
| 4,226,770 | 5/1981 | Yeager | 116/315 X |

Primary Examiner—Daniel M. Yasich
Attorney, Agent, or Firm—Bacon & Thomas

[57] ABSTRACT

A gauge for indicating measurements including a dial plate provided with measurement scales, a central rotating shaft and an indicating plate. The dial plate is disposed in front of the indicating plate, with an arcuate slot opening formed in the dial plate so that a corresponding arcuate colored band provided on the indicating plate may be seen through the opening for unobstructed viewing of measured results as the indicating plate is driven by the shaft. The indicating plate may also be provided with an indicator which extends through the opening to prevent obstruction of the measurement scales during use.

4 Claims, 4 Drawing Sheets

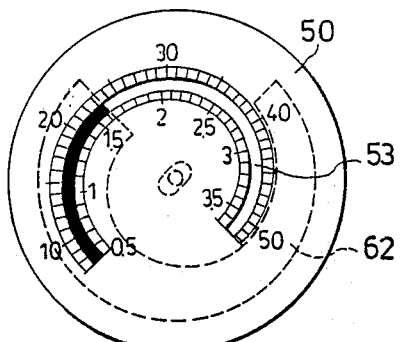
F I G. 6
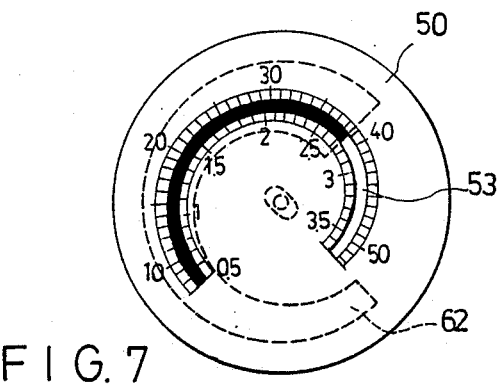
F I G. 7
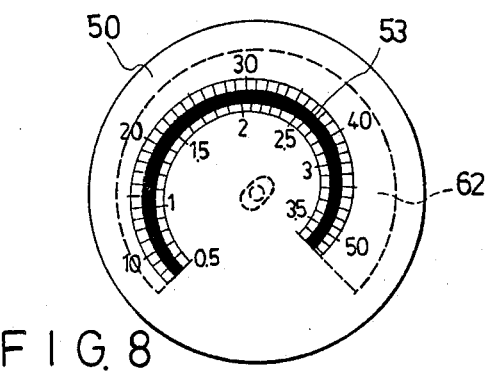
F I G. 8

MEASUREMENT INDICATING GAUGE

BACKGROUND OF THE INVENTION

The present invention relates to a gauge, and more particularly to a gauge which clearly displays the measured results.

Generally, as shown in FIG. 1, a conventional gauge body includes a dial plate 10, a central rotating shaft 20 and an indicating needle 30, the dial plate 10 generally being provided with two scales, a British system scale and a Metric system scale, and the indicating needle 30 being driven by the central rotating shaft 20 during measuring. The most prominent shortcoming of the conventional dial plate 10 is that it easily obstructs the inner-ring scale during measurement. Because of this obstruction, the user is inconvenienced and the possibility of an error in reading the measurement increases. The purpose of this invention is to overcome this problem.

SUMMARY OF THE INVENTION

It is therefore the main object of the invention to provide a gauge which clearly displays the measured results.

A further object of the invention is to provide a gauge having an arcutated colored band which can more clearly display measured readings.

Another object of the invention is to provide a gauge which has an indicating needle mounted between the scales to prevent them from being obstructed.

According to the invention, a gauge for clearly showing measured results comprises a sensing means (not shown), an indicating means disposed to be driven by the sensing means, and a dial plate disposed above the indicating means for showing the relative position of the indicating means during measurement, characterized in that the dial plate has an opening formed therein for showing the position of the indicating means.

An aspect of the invention is that the distance from the opening to the central shaft is greater at its beginning and gradually decreases to its end so that the distance from the beginning of the opening to the central shaft is greater than the distance from the end of the opening to the central shaft. The distance from the periphery of the arcuated colored band to the central shaft is greater than the distance from the opening to the central shaft so that when in use, the colored band can be seen through the opening and measurements can be easily read.

Another aspect of the invention is that the indicating means comprises a supporting member which has an indicator protruded therefrom, the indicator being adapted to protrude from the opening and being capable of moving along the opening when the shaft is rotated by the sensing means.

BRIEF DESCRIPTION OF THE DRAWINGS

The invention will now be more particularly described by way of example, with reference to the accompanying drawings, in which:

FIG. 6 is a front view showing the indicating plate of the gauge rotated 90°;

FIG. 7 is a front view showing the indicating plate of the gauge rotated 180°;

FIG. 8 is a front view showing the indicating plate of the gauge rotated 270°;

DETAILED DESCRIPTION OF THE PREFERRED EMBODIMENTS

Figure 1:
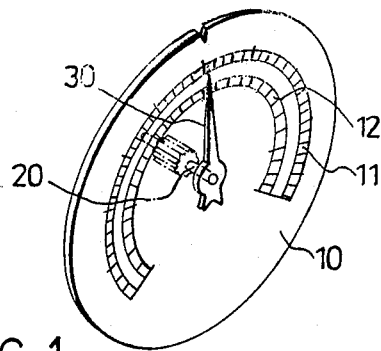
FIG. 1 is a perspective view of a conventional dial plate construction.
Figure 2:
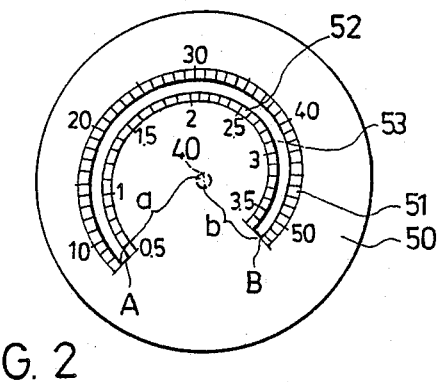
FIG. 2 is a front view of a dial plate of a gauge according to a first embodiment of the invention.
Figure 3:
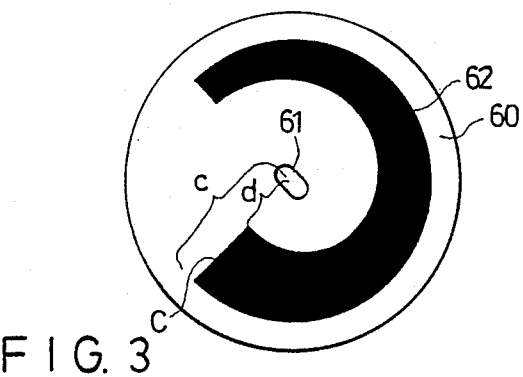
FIG. 3 isi a front view of a indicating plate with a arcutated colored band of the gauge.
Figure 5:
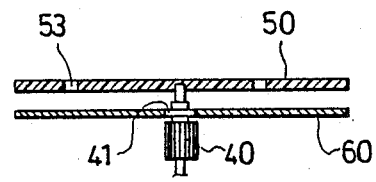
FIG. 5 is a sectional view of the gauge assembly shown in FIG. 4.

In FIGS. 2, 3, and 5 there is shown a gauge according to this invention. The gauge includes a central rotating shaft 40, a dial plate 50, and an indicating means 60. The central rotating shaft 40 is connected to the sensing means (not shown) of the gauge and is rotated by the sensing means when in use. The dial plate 50 is mounted in an upper position on the gauge and is provided with a British system scale 51 and a Metric system scale 52. An opening 53 is disposed between the scales 51 and 52, and its distance from the central shaft is greater at its beginning and gradually decreases to its end, wherein the greatest width at its beginning is indicated at "a" and the smallest width at its end is indicated at "b". The center of the dial plate is secured in the axis of the central rotating shaft 40, and the indicating plate 60 is disposed in a lower position below the dial plate 50 and is engaged with the shaft 40, the central position of the indicating plate 60 being provided with an oval hole 61 which is engaged by a piece 41 to rotate the indicating plate 60.

In addition, an arcuated colored band 62 is formed on the surface of indicating plate 60, the beginning C of the band 62 being parallel and behind the beginning A of the opening 53. when the band 62 is rotated 270 degrees, filling the opening 53, both the band and the opening are opposite each other. The distance c of the central shaft to the band 62 is equal to or greater than distance a (this embodiment has a slightly great distance c), and the distance d of the shaft to the innermost portion of the colored band 62 is equal to or smaller than the distance b (this embodiment has a slightly small distance d) and is disposed relative to the opening 53 in such a way that from the smaller distance d is at the beginning A, and the end of the arcuated band 62 extends outside the periphery of the opening 53.

Figure 4:
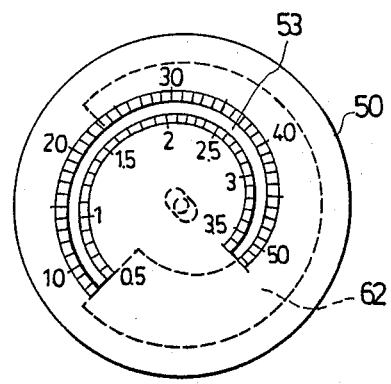
FIG. 4 is front view of the gauge when it is not in use.

In assembly, as best seen in FIG. 4, the beginning C of the arcuated color band 62 of the plate 60 is positioned directly below the beginning A of the opening 53, and extends along the periphery of the opening 53 so that the band 62 may be seen through the opening 53 to clearly show measured results when the plate 60 is rotated by the shaft 40 which is actuated by a sensing element.

FIGS. 6, 7, and 8 show the band 62 in rotated positions of 90, 180 and 270 degrees. These figures illustrate that as the colored band 62 is rotated by the shaft 40, the opening 53 is gradually covered.

Figure 9:
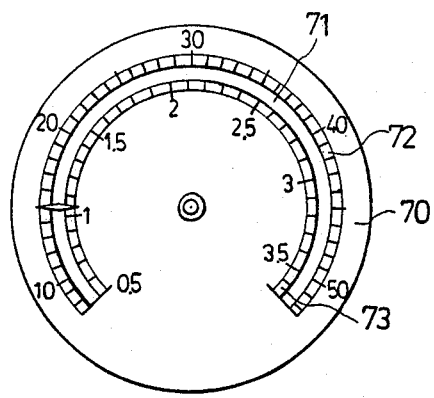
FIG. 9 is a front view of a dial plate of a gauge of another embodiment.
Figure 10:
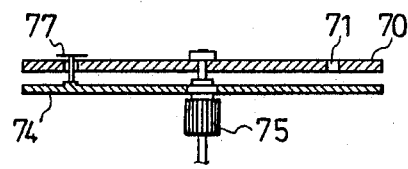
FIG. 10 is a sectional view of the gauge assembly shown in FIG. 9.

In another embodiment of the invention shown in FIGS. 9 and 10, an opening 71 is disposed on the surface of the dial plate 70, which has a British system scale 72 and a Metric system scale 73 at its outside and inside respectively. A supporting member 74 is journalled around the shaft, and has an indicating needle 77 thereon adapted to protrude from the opening 71 so that the member 74 is rotated by the shaft 75 to clearly show measured results.

The aforementioned description, shows how the invention can overcome the shortcoming of the prior art, i.e. the obstruction of the scale readings. Although the invention has been described in terms of certain preferred embodiments, modifications will be apparent to those skilled in the art. All such modifications are intended to be included within the scope of the following claims.

What is claimed is:

1. A measurement indicating gauge comprising:
   (a) a dial plate provided with at least one measurement scale on a front face thereof;
   (b) a central shaft connectable to a sensing means for rotation thereby;
   (c) an indicating plate mounted on the shaft and disposed behind the dial plate, whereby the shaft axis of rotation defines a central axis through the dial and indicating plates;
   (d) an arcuate slot opening formed in the dial plate, the opening including a beginning and an end, wherein the distance of the opening from the central axis progressively decreases along the opening from the beginning to the end to define a segment of a spiral extending around an angular distance of greater than one hundred eighty degrees; and
   (e) the indicating plate being provided with an arcuate color band including a beginning edge and a terminal edge, wherein during rotation of the indicating plate by the central shaft the beginning edge of the color band may move from the beginning to the end of the opening so that the color band is exposed through the opening and cover same to an extent determined by the degree of rotation imparted to the central shaft.

2. The measurement indicating gauge of claim 1 further including a pair of measurement scales disposed on opposite sides of the slot opening.

3. The measurement indicating gauge of claim 1 wherein the color band is configured to prevent simultaneous exposure of the beginning and terminal edges thereof through the opening.

4. The measurement and indicating gauge of claim 1 wherein the indicating plate may be disposed in a position of rotation wherein no portion of the color band is exposed through the opening.

* * * * *